United States Patent
Sanchez et al.

(10) Patent No.: US 7,985,721 B2
(45) Date of Patent: Jul. 26, 2011

(54) CLEANING AND PURIFYING COMPOSITIONS AND ASSOCIATED METHOD FOR PURIFYING PROCESS WATER FROM THE REFINEMENT OF PETROLEUM

(75) Inventors: Michael J. Sanchez, Apple Valley, MN (US); William D. Sanchez, Eaton Rapids, MI (US)

(73) Assignee: MWJ, LLC, Eaton Rapids, MI (US)

( * ) Notice: Subject to any disclaimer, the term of this patent is extended or adjusted under 35 U.S.C. 154(b) by 761 days.

(21) Appl. No.: 11/895,732

(22) Filed: Aug. 27, 2007

(65) Prior Publication Data

US 2009/0057236 A1  Mar. 5, 2009

(51) Int. Cl.
*C11D 17/00* (2006.01)
*C11D 3/37* (2006.01)
*C11D 3/20* (2006.01)
*A61Q 19/10* (2006.01)
*C02F 5/10* (2006.01)
*C02F 1/68* (2006.01)

(52) U.S. Cl. ........ 510/156; 510/155; 510/159; 510/181; 510/252; 510/365; 210/749

(58) Field of Classification Search .................. 252/181, 252/528, 174.17; 510/365, 191, 235, 236, 510/252, 337, 339, 156, 155, 159, 181; 210/749
See application file for complete search history.

(56) References Cited

U.S. PATENT DOCUMENTS

| | | | |
|---|---|---|---|
| 4,274,968 A | 6/1981 | Grutsch et al. | |
| 5,562,834 A | 10/1996 | Bremer et al. | |
| 5,651,833 A | 7/1997 | Bremer et al. | |
| 6,300,300 B1 * | 10/2001 | Sanchez | 510/365 |
| 6,536,523 B1 | 3/2003 | Kresnyak et al. | |
| 2005/0059565 A1 | 3/2005 | Sutton et al. | |
| 2005/0161372 A1 | 7/2005 | Colic | |
| 2009/0320214 A1 * | 12/2009 | Shamayeli et al. | 8/159 |

* cited by examiner

*Primary Examiner* — Ling-Siu Choi
*Assistant Examiner* — Monique Peets
(74) *Attorney, Agent, or Firm* — Knechtel, Demeur & Samlan

(57) ABSTRACT

A cleaning and purifying composition including at least one solvent, an alkaline agent, a deflocculant, at least one surfactant selected from the group comprising an alcohol ethoxylate surfactant, an alkylamino-polyethoxy-sulfate surfactant, a polyether-phosphate ester surfactant, a surfactant that is a phosphate ester of an ethoxylated alcohol, and a surfactant that is a polyethyleneglycol monoaklyl ether, and a bonding agent.

12 Claims, 1 Drawing Sheet

WASTEWATER TREATMENT PROCESS

US 7,985,721 B2

CLEANING AND PURIFYING COMPOSITIONS AND ASSOCIATED METHOD FOR PURIFYING PROCESS WATER FROM THE REFINEMENT OF PETROLEUM

CROSS-REFERENCES TO RELATED APPLICATION(S)

Not Applicable

BACKGROUND OF THE INVENTION

1. Field of the Invention

The present invention relates in general to cleaning and purifying compositions and, more particularly, to compositions for cleaning and purifying process water that results from the refinement of petroleum.

2. Background Art

Wastewaters from petroleum refining consist of cooling water, process water, storm water, and sanitary sewage water. Process water accounts for a significant portion of the total wastewater. Process wastewater arises from desalting crude oil, steam stripping operations, pump gland cooling, product fractionator reflux drum drains and boiler blowdown. Because process water often comes into direct contact with oil, it is usually highly contaminated. The process water must be treated so that it may either be reused in parts of the refinery or discharged through the process area rainwater treatment system. Treatment of process water must effectively remove napthenic acid, separate out any hydrocarbons, and effectively drop out any solids. Napthenic acid, obtained as a byproduct of petroleum refining, is a mixture of carboxylic acids that possess cyclopentane rings and is slightly soluble in water. Methods of treatment of refinery process water have been known in the art for years, and are the subject of several patents, including: U.S. Pat. No. 6,536,523 entitled "WATER TREATMENT PROCESS FOR THERMAL HEAVY OIL RECOVERY;" U.S. Pat. Nos. 5,651,833 and 5,562,834 entitled "WASTE CONCENTRATION AND DESTRUCTION PROCESS;" and U.S. Pat. No. 4,274,968 entitled "PROCESS FOR THE PURIFICATION OF WATER."

U.S. Pat. No. 6,536,523 appears to disclose the transfer of heat energy into a heated separator and re-boiler exchanger to distill oil reservoir produced water and recover distilled water and a concentrated brine or solid product.

U.S. Pat. Nos. 5,651,833 and 5,562,834 appear to disclose removing volatile organic compounds from the wastewater stream by steam stripping and then contacting a stream comprising steam and the stripped organic compounds with a catalyst at an elevated temperature so as to convert the hydrocarbon portion of the organic compounds to a mixture of hydrogen and carbon dioxide.

U.S. Pat. No. 4,274,968 appears to disclose the addition of an effective amount of chemical flocculent to the feed water and subjecting said water to flocculation; passing the flocculated water to a clarifier where suspended solids are separated from the partially purified water; adding about 1 to about 100 parts powdered activated carbon per million parts of water from the clarifier; contacting the water with said carbon in a reaction zone so as to achieve substantial reduction of contaminants in the water; separating the activated carbon from the purified water; and recycling a portion of the separated activated carbon to the clarifier effluent.

An experiment at Stanford University employed clay to purify process water, but this resulted in a new problem of contaminating the clay with hydrocarbons. None of the above-identified or any other prior-art references accomplished removal of napthenic acid, separation of hydrocarbons, and dropping of solids from petroleum refinery process water to yield water free of these contaminants.

It is therefore an object of the present invention to provide a composition (i.e. a mixture or combination of chemicals) and a method for their use that results in the treatment of petroleum refinery process water to yield purified water that is free of contaminating napthenic acid, hydrocarbons, and/or solids.

SUMMARY OF THE INVENTION

In one embodiment, the present invention is directed to a cleaning and purifying composition comprising: (a) at least one solvent; (b) an alkaline agent; (c) a deflocculant; (d) one or more surfactants selected from the group comprising an alcohol ethoxylate surfactant; an alkylamino-polyethoxy-sulfate surfactant; a polyether-phosphate ester surfactant; a surfactant that is a phosphate ester of an ethoxylated alcohol; and a surfactant that is a polyethyleneglycol monoaklyl ether; and (e) a bonding agent.

In a preferred embodiment of the present invention, the at least one solvent comprises a polar solvent, such as water.

In another preferred embodiment of the present invention, the alkaline agent comprises at least one of a hydroxide salt and/or a carbonate salt.

In yet another preferred embodiment of the present invention, the alkaline agent comprises at least one of the group comprising LiOH, NaOH (i.e. caustic soda), KOH, RbOH, CsOH, FrOH, Be(OH)$_2$, Mg(OH)$_2$, Ca(OH)$_2$, Sr(OH)$_2$, Ba(OH)$_2$, Ra(OH)$_2$, and mixtures thereof.

In another aspect of the present invention, the deflocculant comprises at least one of a sodium silicate and an anhydrous sodium metasilicate.

In a preferred embodiment of the present invention, the bonding agent comprises an organic sulfonate, such as, for example, sodium xylene sulfonate.

Preferably, the percent by mass or percent by volume for each component identified in the compositions range from approximately 1 percent to approximately 33 percent.

The present invention is also directed to a cleaning and purifying composition, comprising: (a) water; (b) caustic soda; (c) a deflocculant; (d) an alcohol ethoxylate surfactant; (e) an alkylamino-polyethoxy-sulfate surfactant; (f) a polyether-phosphate ester surfactant; (g) a surfactant that is a phosphate ester of an ethoxylated alcohol; (h) a surfactant that is a polyethyleneglycol monoaklyl ether; and (i) a bonding agent.

The present invention is further directed to a cleaning and purifying composition, comprising: (a) water; (b) caustic soda; (c) sodium silicate; (d) an alcohol ethoxylate surfactant; (e) an alkylamino-polyethoxy-sulfate surfactant; (f) a polyether-phosphate ester surfactant; (g) a surfactant that is a phosphate ester of an ethoxylated alcohol; (h) a surfactant that is a polyethyleneglycol monoaklyl ether; and (i) sodium xylene sulfonate.

A process for purifying petroleum refinery process wastewater, is also disclosed as comprising the steps of: (a) providing a composition, comprising: water; caustic soda; a deflocculant; an alcohol ethoxylate surfactant; an alkylamino-polyethoxy-sulfate surfactant; a polyether-phosphate ester surfactant; a surfactant that is a phosphate ester of an ethoxylated alcohol; a surfactant that is a polyethyleneglycol monoaklyl ether; and a bonding agent; (b) transferring process water into a first fractioned pond and introducing the composition into the first fractioned pond, thereby partially treating the process water; (c) transferring the partially treated process water from the first fractioned pond into a second fractioned pond; (d) transferring the partially treated process water from the second fractioned pond into a third fractioned pond; (e) transferring the partially treated process water from the third fractioned pond to a hydrocyclone; (f) transferring the partially treated process water from the hydrocyclone to a precipitating tank thereby fully treating the same; and (g) recovering treated water from the precipitating tank.

BRIEF DESCRIPTION OF THE DRAWINGS

The invention will now be described with reference to the drawings wherein.

DETAILED DESCRIPTION OF THE INVENTION

Figure 1:
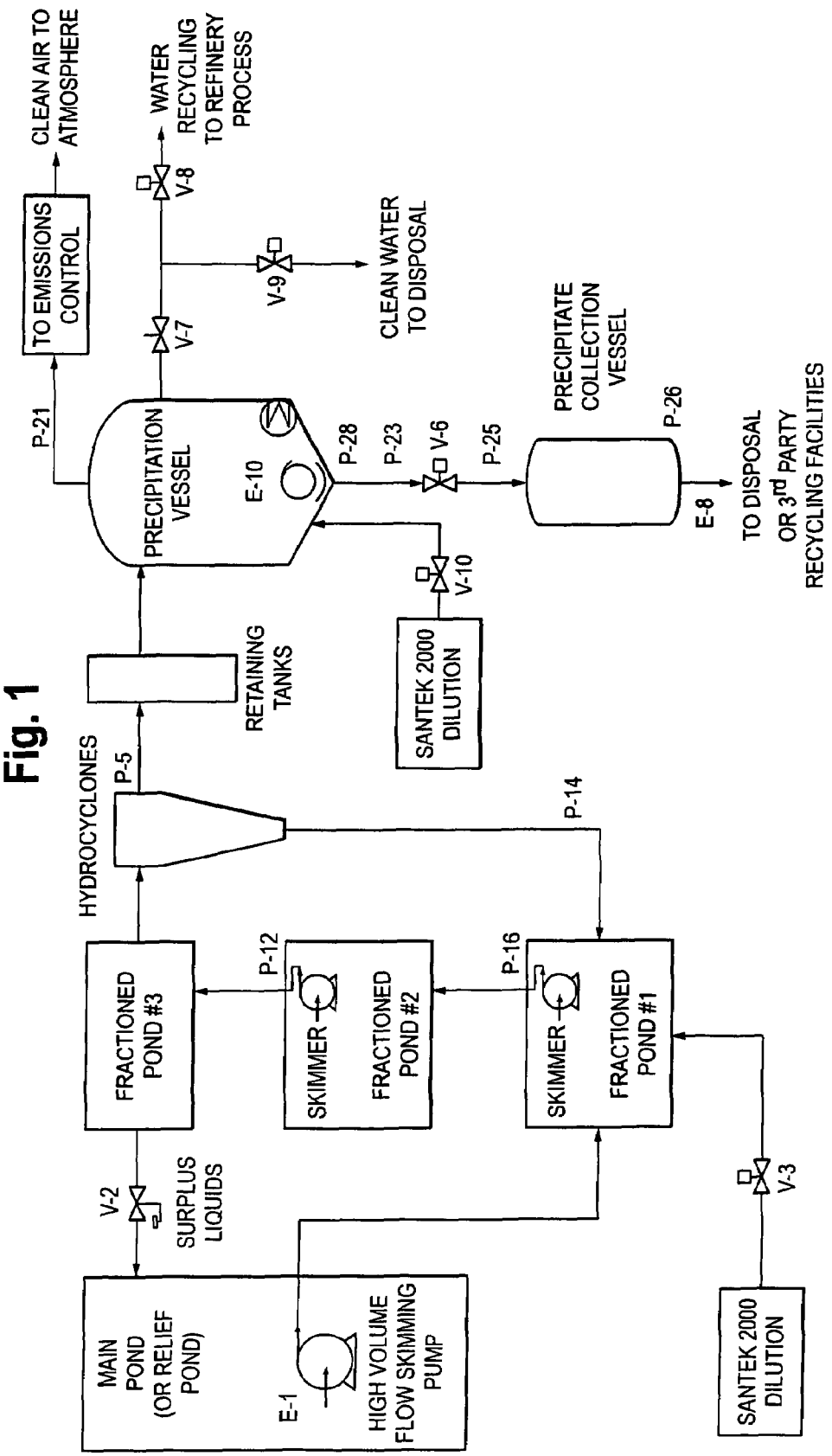
FIG. 1 of the drawings is a schematic representation of a process for purifying petroleum refinery process wastewater in accordance with the present invention.

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

In accordance with the present invention, novel compositions (i.e. a mixture or combination of chemicals) are provided which are introduced into a process that results in the purification of petroleum refinery process water. The composition provides unique characteristics and properties that include, but are not limited to, being non-toxic and safe for the environment, low foaming, biodegradable, non-carcinogenic, disinfectant, non-flammable, and unexpectedly effective.

In a first embodiment of the present invention, a cleaning and purifying composition comprises: one or more solvents, an alkaline agent, a deflocculant, one or more surfactants including, an alcohol ethoxylate surfactant, an alkylamino-polyethoxy-sulfate surfactant, a polyether-phosphate ester surfactant, a surfactant that is a phosphate ester of an ethoxylated alcohol, and a surfactant that is a polyethyleneglycol monoaklyl ether, and a bonding agent.

Preferably the one or more solvents comprises a polar solvent, such as water. However, it will be understood that any one of a number of other polar solvents that would be known to those having ordinary skill in the art are likewise contemplated for use.

The compositions of the present invention also comprise an alkaline agent, such as a hydroxide salt and/or a carbonate salt. Hydroxide salts include, for example, LiOH, NaOH (e.g. caustic soda), KOH, RbOH, CsOH, FrOH, Be(OH)$_2$, Mg(OH)$_2$, Ca(OH)$_2$, Sr(OH)$_2$, Ba(OH)$_2$, Ra(OH)$_2$, and mixtures thereof. Carbonate salts include, for example, group I and II carbonates. It will be understood that the alkaline agent serves to maintain alkalinity and/or enhance the properties of the anionic surfactants present in the composition. It further serves to neutralize napthenic acid and aid in its precipitation as insoluble salts. Applicant has uncovered that liquid caustic soda (typically 40-60% caustic) in combination with solid caustic soda appears to be a superior form of caustic soda.

A deflocculant is used, in accordance with the present invention, to aid in the treatment of the process water. The deflocculant serves as a de-emulsifier to facilitate the separation of water and oil from a water and oil emulsion. In a preferred embodiment, a combination of liquid sodium silicate and anhydrous sodium metasilicate (Drymet 59 available from the Crossfield Company) is utilized.

The compositions of the present invention also comprise one or more surfactants, including an alcohol ethoxylate surfactant, an alkylamino-polyethoxy-sulfate surfactant, a polyether-phosphate ester surfactant, a surfactant that is a phosphate ester of an ethoxylated alcohol, and a surfactant that is a polyethyleneglycol monoaklyl ether. An example of an alcohol-ethoxylate surfactant includes Triton XL-80N, which is commercially available from the Dow Chemical Company. An example of an alkylamino-polyethoxy sulfate surfactant includes Triton QS-15, which is commercially available from the Dow Chemical Company. An example of a polyether phosphate ester surfactant includes Triton QS-44, which is commercially available from the Dow Chemical Company. Suitable surfactants that are phosphate esters of ethoxylated alcohols include, for example, Tyrfac 5553 and Tryfac 5554, which are commercially available from the Cognis Corporation. In accordance with the present invention, surfactants that are polyethyleneglycol monoaklyl ethers include, for example, Trycol 5968, Trycol 5949, and Trycol 5968, which are commercially available from the Henkel Corporation. It will be understood that while specific examples of surfactants have been disclosed for illustrative purposes only, any one of a number of other surfactants that would be known to those having ordinary skill in the art likewise contemplated for use.

The compositions of the present invention also include a bonding agent, such as, for example, a low foam, non-polar, bonding. One preferred bonding agent is sodium xylene sulfonate, which is commercially available as Vanwet XSX-40 from the Univar Corporation.

Preferably, the percent by mass or percent by volume for each component identified in the compositions range from approximately 1 percent to approximately 50 percent, and more preferably range from approximately 1 percent to approximately 30 percent.

It will be understood that compositions may also include colored dyes, fragrances, etcetera. It will be appreciated by those skilled in the art that the compositions (i.e. mixtures of chemicals) employed in this invention can be prepared by any customary industry means.

In accordance with the present invention, the following non-limiting composition is provided:

Example I

1. Liquid caustic soda (40%-60% NaOH) (0.5-5 Gal.)
   Caustic soda solid pellets (1-10 Lbs.)
2. Liquid sodium silicate (5-20 Gal.)
   Anhydrous sodium metasilicate (75-125 Lbs.)
3. Triton XL-80N (1-10 Gals.)
   Triton QS-15 (1-10 Gals.)
   Triton QS-44 (1-10 Gals.)
4. Trycol 5968 (5-20 Gals.)
   Trycol 5949 (5-20 Gals.)
5. Vanwet SXS-40 (0.5-5 Gal.)
6. Acid Red 14 (color to suit)

The compositions employed in this invention result in the treatment of petroleum refinery process water to yield purified water that is free of contaminating napthenic acid, hydrocarbons, and solids when used in combination with the process elucidated in Example II.

Example II

The present invention employs the mixture of chemicals in Example I with the following process. Referring now to FIG.

1, contaminated process water from a main pond is transferred into a first fractioned pond wherein the composition in Example I is provided (e.g. injected, infused, etcetera). Next, the first stage treated water from the first pond is transferred to a second fractioned pond. The second state treated water is then transferred to third fractioned pond. It will be understood that when the water is going through these ponds it is getting retention time, starting the separation. The water is next sent to a hydrocyclone after being associated with the fractioned ponds. The hydrocyclone assists with dropping out any solids. After being exposed to the hydrocyclone, a majority of the water is transferred to the one or more retaining tanks. The remaining water and solids in the hydrocyclone can be sent back to the first fractioned pond. From the retaining tanks, the water is transferred to a precipitating vessel. In this vessel an auger will remove the salts at the bottom created from the napthenic acids. Once through the precipitating vessel, the bulk of the clean water is transferred back to the oil company for reuse. Water not to be reused is sent out as clean water for disposal.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A cleaning and purifying composition, comprising:
   at least one solvent;
   an alkaline agent;
   a deflocculant;
   an alcohol ethoxylate surfactant; an alkylamino-polyethoxy-sulfate surfactant; a polyether-phosphate ester surfactant; a surfactant that is a phosphate ester of an ethoxylated alcohol; and a surfactant that is a polyethyleneglycol monoaklyl ether; and
   a bonding agent.

2. The cleaning and purifying composition according to claim 1, wherein the at least one solvent comprises a polar solvent.

3. The cleaning and purifying composition according to claim 1, wherein the at least one solvent comprises water.

4. The cleaning and purifying composition according to claim 1, wherein the alkaline agent comprises at least one of a hydroxide salt and a carbonate salt.

5. The cleaning and purifying composition according to claim 1, wherein the alkaline agent comprises at least one of the group comprising LiOH, NaOH, KOH, RbOH, CsOH, FrOH, $Be(OH)_2$, $Mg(OH)_2$, $Ca(OH)_2$, $Sr(OH)_2$, $Ba(OH)_2$, $Ra(OH)_2$, and mixtures thereof.

6. The cleaning and purifying composition according to claim 1, wherein the alkaline agent comprises caustic soda.

7. The cleaning and purifying composition according to claim 1, wherein the deflocculant comprises at least one of a sodium silicate and an anhydrous sodium metasilicate.

8. The cleaning and purifying composition according to claim 1, wherein the bonding agent comprises an organic sulfonate.

9. The cleaning and purifying composition according to claim 1, wherein the bonding agent comprises sodium xylene sulfonate.

10. The cleaning and purifying composition according to claim 1, wherein the percent by mass or percent by volume for each component ranges from approximately 1 percent to approximately 33 percent.

11. A cleaning and purifying composition, comprising:
    water;
    caustic soda;
    a deflocculant;
    an alcohol ethoxylate surfactant;
    an alkylamino-polyethoxy-sulfate surfactant;
    a polyether-phosphate ester surfactant;
    a surfactant that is a phosphate ester of an ethoxylated alcohol;
    a surfactant that is a polyethyleneglycol monoaklyl ether; and
    a bonding agent.

12. A cleaning and purifying composition, comprising:
    water;
    caustic soda;
    sodium silicate;
    an alcohol ethoxylate surfactant;
    an alkylamino-polyethoxy-sulfate surfactant;
    a polyether-phosphate ester surfactant;
    a surfactant that is a phosphate ester of an ethoxylated alcohol;
    a surfactant that is a polyethyleneglycol monoaklyl ether; and
    sodium xylene sulfonate.

* * * * *